United States Patent
Braghiroli

(10) Patent No.: US 8,271,972 B2
(45) Date of Patent: Sep. 18, 2012

(54) METHOD AND APPARATUS FOR UPDATING OF SOFTWARE IN AND/OR COLLECTION OPERATIONAL DATA OF IN SITU EQUIPMENT

(75) Inventor: Francesco Braghiroli, Reggio Emilia (IT)

(73) Assignee: Snap-On Equipment SRL a Unico Socio, Correggio (IT)

( * ) Notice: Subject to any disclaimer, the term of this patent is extended or adjusted under 35 U.S.C. 154(b) by 1137 days.

(21) Appl. No.: 11/889,055

(22) Filed: Aug. 8, 2007

(65) Prior Publication Data

US 2008/0046881 A1    Feb. 21, 2008

(30) Foreign Application Priority Data

Aug. 8, 2006   (EP) .................................... 06016557

(51) Int. Cl.
*G06F 9/445* (2006.01)

(52) U.S. Cl. ...................................... 717/173; 717/178

(58) Field of Classification Search .................. None
See application file for complete search history.

(56) References Cited

U.S. PATENT DOCUMENTS

2005/0226641 A1 * 10/2005 Ando et al. ....................... 399/8
2008/0005733 A1 * 1/2008 Ramachandran et al. ..... 717/168

OTHER PUBLICATIONS

European Search Report issued in European Patent Application No. 06016557.8-1243, mailed Nov. 23, 2006.

* cited by examiner

*Primary Examiner* — Chuck Kendall

(74) *Attorney, Agent, or Firm* — McDermott Will & Emery LLP

(57) ABSTRACT

An update/upgrade concept which regards a convenient procedure for making updates or upgrades of control software and/or configuration data available to microcontroller-based hardware of machine units in the field without requirement of special tools and experience. In particular, by use of a standard memory device as known in the field of digital cameras, mp3-players whatsoever, together with a procedure which detects an available update/upgrade stored on such memory device and performs a respective download of the update/upgrade data to the respective microcontroller-based hardware, if applicable. An additional or optional aspect relates to collecting of operational data during operation of a machine unit in the field, which operational data can be transferred/carried back to the manufacturer of the machine unit for research and development purposes as well as for quality control, also a tracking of machine units through their lifetime is made possible thereby.

19 Claims, 4 Drawing Sheets

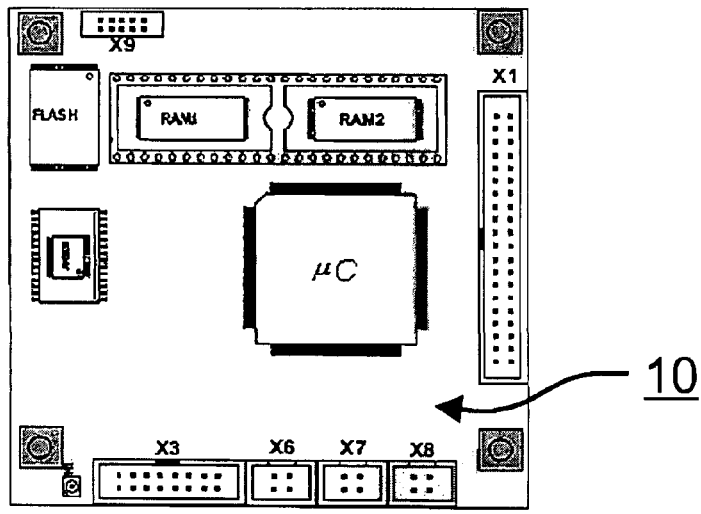
(prior art) Fig.1
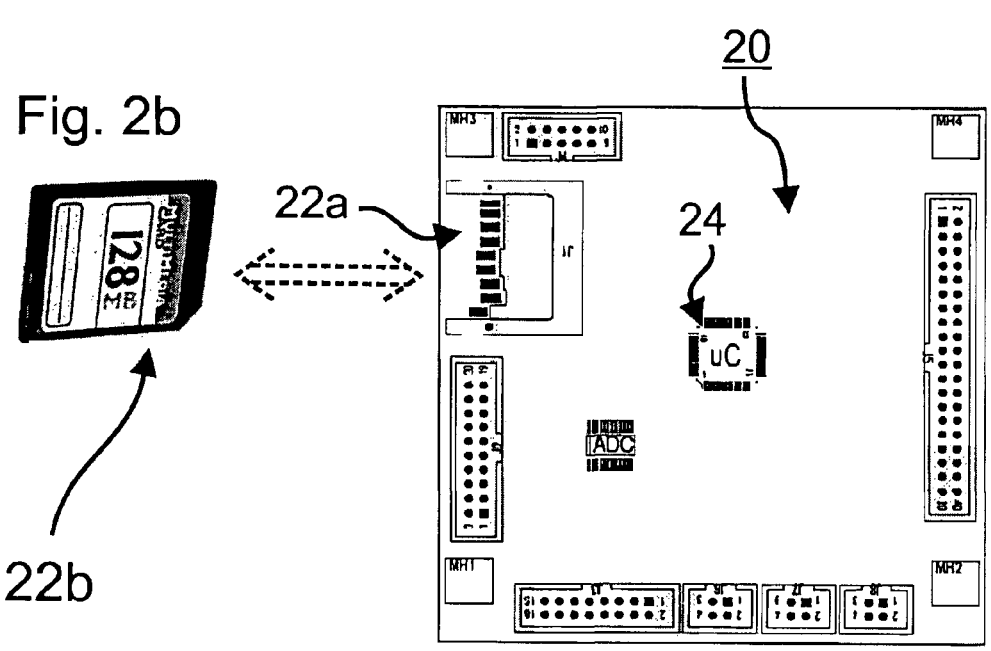
Fig.2a

METHOD AND APPARATUS FOR UPDATING OF SOFTWARE IN AND/OR COLLECTION OPERATIONAL DATA OF IN SITU EQUIPMENT

FIELD

The invention relates to a method for exchanging data in memory means of at least one hardware device of a machine unit according to independent claim 1, a computer program product according independent claim 11, use of a memory device as a data carrier for collected operational data of a machine unit according to claim 14, and a machine unit according to independent claim 16.

BACKGROUND

The area of the present invention more specifically relates to a machine units used in automotive shops, so-called automotive shop equipment. In particular, the present invention relates to a technique for updating or upgrading data or software installed in such a machine unit. Among such machine units, there are some considered as high-end equipment, such as wheel balancers, wheel aligners, brake testing stands and so forth, which comprise embedded computer hardware (HW), on which dedicated software (SW) is running for controlling several functions related to the respective service given by the machine unit, and also for processing of data as, for instance, measurement data related to the respective services performed on an automotive vehicle, or data related to the automotive vehicle which are required for the service to be performed and so forth.

For instance, a premium or high-end wheel balancer, i.e. a machine unit which comprises most developed technology as it regards the requirements necessary for the automotive service to be performed as well as it regards the human interface to the user of the machine unit, making the machine easy to use as well as more efficient in view of quality of service performed by the machine. Such a premium machine unit usually includes a display as visual user interface for presenting information to the user, a keyboard or at least a keypad as an interface for input of commands or data by the user, which data may be required to select among several service functions provided by the machine, or to setup a certain service function to the particular automotive vehicle to be serviced next with certain configuration data required for performing the service correctly.

As to computer hardware in such computerized or processor-controlled machines, a computer-controlled system comprises fixed memory in which fixed content stays resident. Such content is mainly used for the software programs which control the respective machine unit or certain computer controlled hardware, such as microcontroller-based hardware boards, e.g. for sensing purposes and/or actuating purposes. Further content may be data required by the machine during operation as mentioned above. An embedded computer system may be a computer board of a personal computer according to the industry standard, where software may be divided into basic input output routines, the operating system run on the computer as platform for application programs for access to the several function provided by the machine unit. Further, in the fixed memory can also be located help or support information for the user and/or screen texts in different languages, icons and graphics, fonts, printout style sheets and so forth. The fixed memory devices with the fixed contents are used during operation in "read-only" mode; that is, their data can be read but not be modified.

FIG. 1 shows a simplified sketch of a (circuit) board 10 of a microcontroller-based board, which can be used for control of a certain technical function performed by the machine unit. The board 10 comprises a microcontroller μC, a flash memory FLASH, and random access memory modules RAM1, RAM2 as working memory. Further, the board comprises several connectors X1 to X9, which are used, for example, for connection to power supply, or interfaces to actuators and/or from sensors of the machine unit and so forth, which implementation is all well known per se.

In this context, it is further known that memory devices with fixed content can be made removable by use of removable connected memory units, such as an electrical programmable read-only memories (EPROM) device, which are available in several form factors and packages. For instance, a removable connected EEPROM storage device allows for service personal to update or upgrade, respectively, the SW of the machine unit by replacing the present memory device with an (exchange) memory device containing the updated or upgraded, respectively, content data. Furthermore, in the prior art memory devices with fixed content are usually programmed in the factory of the manufacturer of the machine unit and are installed first time during production of the unit or machine.

Alternatively, it may be also possible to perform a SW update by a download procedure by which new content to the respective memory device is downloaded, for instance, by means of an external service PC connected to the low level hardware board, e.g. by a serial line interface connection. However, it is worth noting, that even that SW upgrade is possible by serial line download using a PC, this feature is not used in practice in the field.

Further, currently the computer system of such computerized machine units collect a list of operational data, such as issued error codes, calibration data, user preferences, operation counters and alike, in small EPROMs which are also installed on the low level HW boards. For feedback to the manufacturer of the machines, such collected data could provide worthwhile information for the development of future machines or improvement of the machines in the shops.

SUMMARY

It is at least one object of the present invention to provide a solution for updating or upgrading of computerized machines, which solution can easily be performed by the user or owner of the machine, in particular without requiring expensive service equipment or help of service personnel. It is one further object to provide a solution by which additionally a feedback of the above-mentioned operational data to the manufacturer of such computerized machines can easily be accomplished, in particular without employing of service personnel or requirement of certain data connections.

In accordance with the invention, at least one of the aforementioned objects is attained by method, computer program product and automotive shop service machine claims.

Certain embodiments and further developments thereof are disclosed in various dependent claims.

According to a first aspect, the method for exchanging data in memory means of at least one hardware device of a machine unit, comprises connecting a first data storage device to the machine unit; checking whether the data stored in the memory means of the at least one hardware device comprises an older version than the version of data on the first data storage device; and downloading data from the second data storage device in the memory means of the at least one hardware device, thereby replacing the data stored in the memory means by the data stored in the first data storage device, dependent on the result of the checking, i.e. if the result indicates that the data in the memory means comprises an older version than the data stored on the first data device.

By the downloading at least one of updating or upgrading of software code means in the memory means of the at least one hardware device can be achieved. Thus, a modification of particular functions performed by the hardware device can be achieved, which corresponds to a software update. Further, also implementation of new functions can be provided, what corresponds to a software upgrade. Of course, update and upgrade may be done simultaneously. Further, the downloading may be used to perform at least one of updating or upgrading of configuration parameters in the memory means of the at least one hardware device.

The downloading can be performed either automatically, for instance, by software running in the respective microcontroller or processor device in the machine unit may be configured to perform the respective operations/procedures, or in response to a respective request by the user of the machine unit, i.e. software running in the microcontroller or processor device of the machine unit may be configured to perform the respective operations/procedures in response to a command input by the user of the machine. Of course, there may be also a check performed which determines whether the software or data to be downloaded is dedicated to the respective machine such that download of wrong data into the machine will be avoided.

A second aspect concerns disconnecting a second data storage device connected to the machine unit such that the disconnecting and the connecting form an exchanging operation/procedure, in which the second data storage device is exchanged by the first data storage device. Thus, it is possible, before the exchanging to store operational data of the machine unit in the second data storage device such that the stored operational data is available for further use outside the machine unit.

In a further development of the second aspect, operational data of the machine unit are continuously collected during operation of the machine unit and stored in the second storage device. In other words, the second storage device is used for storing operational data before the exchange by the first storage device and after the exchange the first data device is also used for storing operational data. Hence, by this continuous collecting of relevant operational data can be gathered trough the whole time of operation.

The storing may be performed either automatically, for instance, by software running in a respective microcontroller or processor device in the machine unit may be configured to perform the respective operations/procedures, or in response to a respective request by the user of the machine unit, i.e. software running in the respective microcontroller or processor device may be configured to perform the respective operations/procedures in response to a command input by the user of the machine.

Accordingly, the respective data storage device, i.e. the first and second data storage device, when connected to the machine unit, for instance, to a microcontroller-based board or alternatively, to an embedded computer device which is part of the machine unit, which storage devices can be used in: "read-write" mode to store operational data of the machine unit during the lifetime of the machine unit. Thus, operational data can be permanently collected. For that purpose, the respective storage devices comprise preferably non-volatile memory technology such that data stored to the storage device does not require power supply. However, memory technology, which allows for change of data stored therein, without need of special hardware could in certain situations be preferred. For instance, one option would be an electrical erasable programmable read-only memory (EEPROM) module. However, more developed embodiments are pointed out in more detail below.

By storing of relevant operational data to the second or first, respectively, memory device, the memory device provides for a transport container of collected operational data for further use. In a preferred embodiment, by this feature, relevant operational data stored in the second data storage device is send back to the manufacturer of the machine unit for use of the collected operational data for quality control purposes or continuous tracking of the respective machine unit. In another embodiment, the second data storage device is used, additionally or alternatively, to transfer the collected operational data to a central computer unit, which maintains a database and the operational data may be used for maintenance scheduling.

A third aspect concerns a computer program product, which at least comprises code means adapted to produce operations/procedures of a method when run on a computer device of a machine unit, which method comprises detecting an connection of a data storage device to the computer device; checking whether data stored in memory means, monitored by the computer device and part of the machine unit, comprise an older version than the version of data stored on the data storage device; and downloading data from the data storage device in the memory means of the at least one low hardware device, depending on the result of the checking. The user can perform the downloading either automatically or in response to a respective request. Further, the method may comprise storing of collected operational data of the machine unit in the data storage device.

A fourth aspect is directed on use of a memory device as a data carrier for collected operational data of a machine unit in a method according to the second aspect of described above. Such a memory device is a preferably a non-volatile memory device, such as one of a compact flash card, a smart media card, a multimedia card (MMC), a secure digital memory card (SD), a memory stick, a micro secure digital memory card, or a micro drive. It goes without saying that the memory devices described with reference to the fourth aspect can be used also for the first aspect.

A fifth aspect regards a machine unit, which basically comprises at least one microcontroller-based board specialized for a certain function of the machine unit, and at least one hardware interface for a user-operable removable connection of a first data storage device on which computer program code means or configuration data for the at least one microcontroller-based board are stored.

In one embodiment, the machine unit further comprises control means which are configured to detect connecting of the first data storage device to the at least one hardware interface and to determine whether data present in a memory means of the at least one controller board is older than data stored on the first data storage device and, dependent on the determination result, to download the data from the first data storage device in the memory means of the at least one controller board.

In a further development, the machine unit comprises an embedded computer device, which is used as a central control unit of the machine unit and is configured to provide for an (high-level) user interface (UI) of the machine unit and further is configured as the control means.

In a further development of the machine unit the control means are further arranged to collect information during the life of the machine and to store the operation information in the first data storage device by using the first data storage device in read-write mode.

The first data storage device can comprise several memory areas, of which at least one first memory area is a read-only memory and at least one second memory area can be used in read-write mode. Accordingly, the collected operation information during the life of the machine is stored in the at least one second memory area.

The stored operational data comprises at least one of issued error codes, diagnostic data, statistical data, performed service operations, operation counters and so forth.

In a certain embodiment the machine unit is configured such that collected operational data is retrievable to a user in a dedicated mode of the user interface program in form of at least one of a printout. Alternatively or additionally, the collected operational data can be made available to other (computer) systems through a wired or wireless network connection.

Preferably, as mentioned in the introduction part, the machine unit is an automotive shop service machine, such as a wheel balancer, a wheel aligner, a brake test stand, an automotive diagnosis unit or a combined unit therefrom.

Accordingly, a first basic idea of the invention is to include in the first data storage device all software (SW) updates and/or upgrades to be installed in the machine unit, more particular in specialized low level board of the machine unit which require the SW updates and/or upgrades. An user interface (UI) SW running on an embedded PC checks, whether the SW present on the low level HW is an older version than what is available on the data storage device. If this is the case, the UI downloads the newer version to the low level boards, either automatically or upon user's request.

According to a second basic idea of the invention, the data storage device is used to collect information during the life of the unit. Preferably, the data storage device is used by the respective part of the machine unit, which comprises the control means, e.g. a microcontroller based board or an embedded PC SW, in "read-write" mode. As mentioned above, the data storage device for data collection may also be a separate data storage device with respect to the primary device containing the update or upgrade SW. In this case the secondary—data collector—device is the only one which needs to be in "read-write" mode, thus reducing possibility of corruption of the main memory unit of the machine unit. Thus, the device can be removed from the machine unit without affecting the functionality of the unit.

The major advantage is straight and simple: By the proposed new design update/upgrade as well as collection/carrying of operational data back to the manufacturer is easier to manage for service people and easier to find in the market.

BRIEF DESCRIPTION OF THE DRAWINGS

Other objects and features will become apparent from the following detailed description considered in conjunction with the accompanying drawings. It is to be understood, however, that the drawings are designed solely for purposes of illustration and not as a definition of the limits of the invention, for which reference should be made to the appended claims only. It should be further understood that the drawings are merely intended to conceptually illustrate the structures and procedures described herein.

FIG. 1 shows a schematic illustration of a microcontroller-based board, as used in automotive shop machine units in the prior art;

FIG. 2a depicts a microcontroller-based board with several features according to the present invention;

FIG. 2b is 3-D-view of an example for data storage device, which may be used for an implementation of and according to the present invention;

DESCRIPTION OF EMBODIMENTS

Figure 3A:
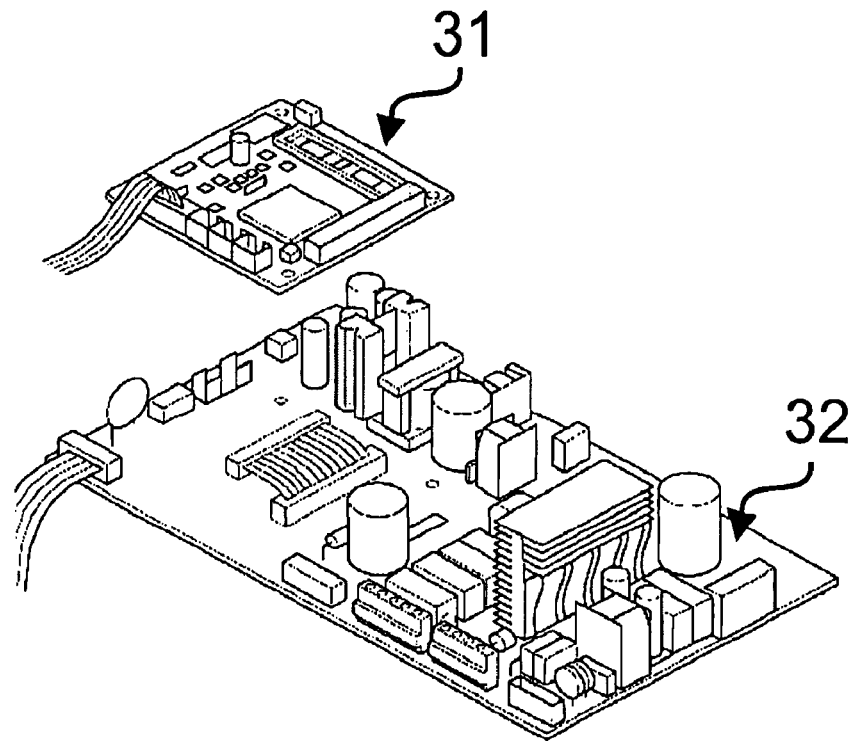
FIG. 3a illustrates a 3-D-view of a microcontroller-based hardware board and the required power supply board.

A data storage device of a specialized, so-called low level, microcontroller-based HW board comprises usually, as illustrated by way of an example in FIG. 1, several types of memory means, such as memory with fixed content (FLASH) and memory as working memory (RAM1, RAM2). In the case, when the machine unit further comprises an embedded PC, there may be further internal or external mass data storage devices such as hard disks, optical storage devices and so forth.

As memory for fixed content, typically flash memory technology is used which is a form of pre-programmed electrical programmable read-only memory (EPROM) or electrically erasable programmable read-only memory (EEPROM) Such memory devices are an example for non-volatile read write memory (NVRWM), which as form of at least once writeable memory unlike random access memory (RAM) as the working memory holds its content without the need of a power supply. EEPROM type devices are right now commonly used in memory cards, USB flash drives, MP3 players, digital cameras and mobile phones. For the access on such memory IDE-like interfaces, USB or equivalents may be used.

The first aspect of the invention will now be described in connection with a data storage device of the new generations, which provide very compact designs. For example, multimedia cards (MMC) are very compact, very popular and provide very high storage capability.

Now with reference to FIG. 2a, a low level microcontroller based hardware (HW) board 20 configured according to the invention is described. Compared to the board 10 of FIG. 1 the board 20 of FIG. 2a comprises a more compact design, which allows for integration, in the example of FIG. 2a, of an MMC-connector 22a. In this example, a MMC is used as the first and second storage device; an illustration of the MMC 22b is depicted in FIG. 2b. The MMC-connector 22a on the board 20 offers the interface for the MMC storage device direct on the low level microcontroller-based board 20. By this configuration it is possible to implement most of the features of the invention, described above, direct into low-end machine units, i.e. in machine units, which do not include a powerful embedded PC. Further, on the board 20 a microcontroller 24 is used, which has integrated flash memory as well as working memory. The non-volatile flash memory stores the computer program code means, which are run by the microcontroller 24 in operation. That is to say, the necessary method has to be implemented in these code means, which is known per se.

As described above, it is possible to use the whole memory of the MMC for download of updated or upgrade software to the flash memory of the microcontroller 24 as well as for configuration data which are required by the microcontroller for proper operation. Further, on the storage device, i.e. the MMC according to the example, operational data can be stored during operation of the machine unit. Such stored information could be for example: issued error codes, diagnostic data, such as values for voltage, current, speed, forces, frequency and so forth. Further, statistical data a respective machine unit, such as, in case of a wheel balancer, measured imbalances, measured runout values, weight usage, wheel dimensions, calibration history performed service operations, operation counters, etc.

According to one aspect of the invention the collected and stored operational data can be made available to the user or the service in a dedicated user interface (UI) screen, could be made available in a specific printout (assumed the machine unit comprises a respective printer or at least a respective connector therefor), or can be made available to other systems through a network connection (either wired or wireless). In principle, adding networking capability to the machine unit may also be a possibility when no embedded PC is available in the machine unit. For instance, the machine unit could be provided with a low level networking device. This would provide an alternative possibility for updating/upgrading data as well as for collecting of operational data of the machine unit. In other words, networking capability is not strictly limited to machine units with a PC.

The data storage device could also be removed by a service technician or the user and plugged into a reader in order to download data into a stand alone PC. This feature is also useful for data collection in the field and in the factory during manufacturing of the unit to support quality control and continuous tracking.

Figure 4:
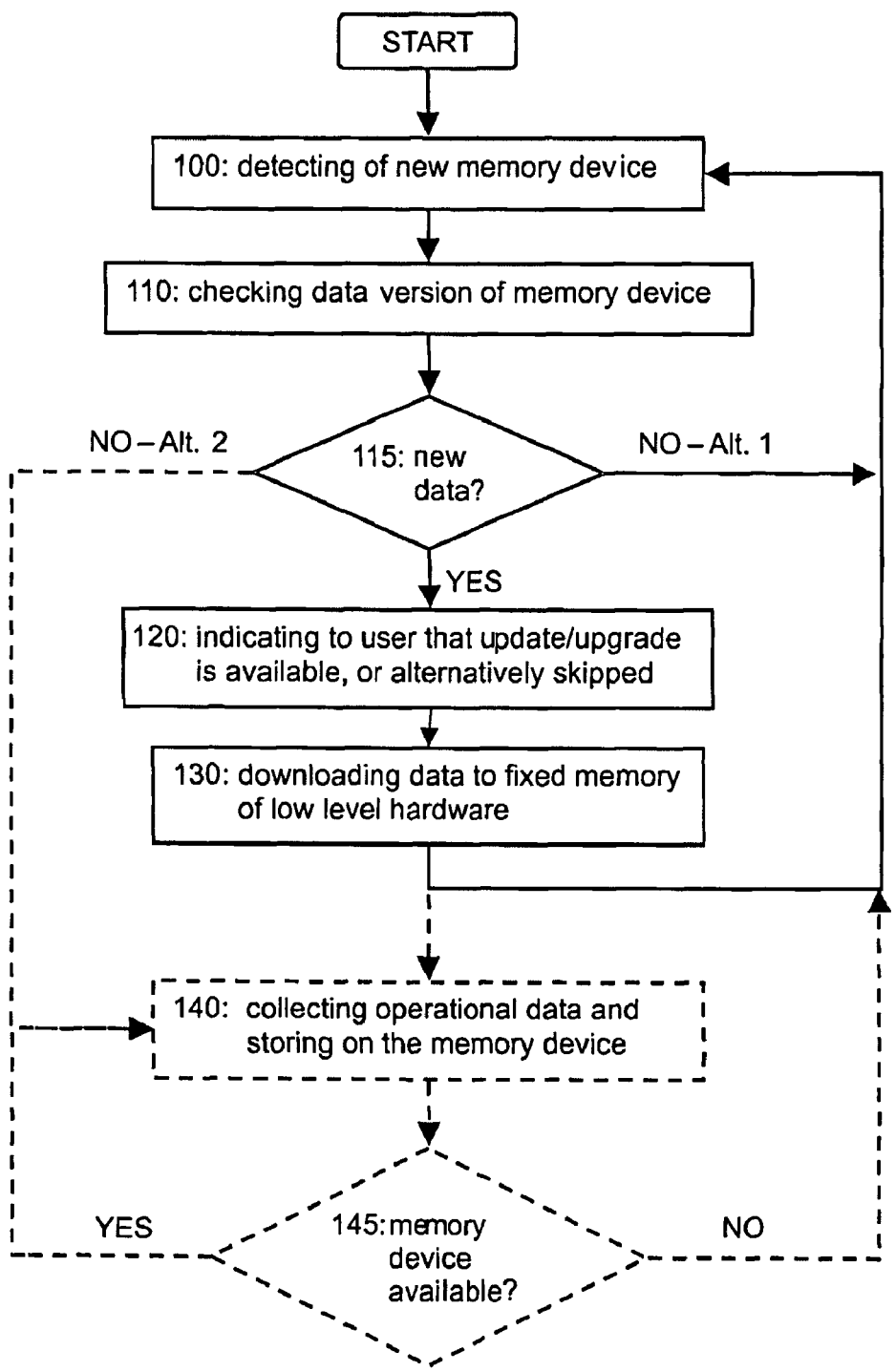
FIG. 4 is flow chart depicting the procedure for data update/upgrade and optionally/additionally for collecting of operational data according to the invention.

Now with reference to FIG. 4, depicting a flow diagram with the basic operations/procedures according to the above described convenient and easy to carry out procedure for updating/upgrading software/data and optionally or additionally collecting of operational data during operation/life time of a machine unit. In box 100, connection of a memory device to the respective connector at the machine unit is to be detected. This may be performed by means of an interrupt triggered by inserting of the memory device in the memory device connector. Another option may be that the respective control means of the machine unit periodically carry out a check whether a new memory device has been connected. Such connection of a new memory device can take place also by disconnecting the old memory device and replacing it by the new memory device. In the next box 110, it will be checked whether the version of the data stored on the new memory device is more actual than the corresponding/present data stored in memory means of the machine unit, in particular in the designated low-level hardware board. If the result of the check indicates that there is no newer or more actual data stored on the memory device, the very likely situation might be that the old memory device has been disconnected and connected again. Therefore, the procedure will go back to box 100. However, it is of course possible to carry out some more sophisticated diagnosis as checking whether a failure has been encountered or to give a feedback to the user.

In case, the check in box 110 has found that there is a new memory device connected to the machine unit which comprises update/upgrade data stored, the procedure goes to box 120, where an optional process may be to inform the user of the machine that an upgrade/update is available, which will be installed in response to a respective command given by the user. Of course, this process may be omitted such that the following procedure takes place automatically.

Then, the procedure goes, when the user inputs the respective command or in the automatic procedure directly, to box 130, where the respective routine for the download of the updated or upgraded software code and/or configuration parameters are transferred into the applicable fixed memory of the respective low-level hardware board. It is noted, that it may be also possible to update and/or upgrade several low-level hardware boards, if the memory device connector is located on a central computer device of the machine unit, as for instance an embedded PC, which takes care for the distribution of the data to the correct destination.

After the update/upgrade has been performed correctly, the procedure can go directly to box 100, where the system waits for the next event signalling a memory device has been connected to the machine unit. However, according to a further aspect of the invention the procedure may go to box 140, where continuously operational data of the machine unit are collected and stored to the memory device. Box 145 denotes that periodically or before a writing access to the memory device takes place, it will be checked whether the memory device is still present or not. In case, the memory device has been disconnected, the procedure goes to box 100 and waits for the new memory device. That is to say, in any case—also when there is a hardware failure with the memory device the system will wait for connection of the next memory device and no longer try to store data on the memory device. Of course, it goes without saying that here further more sophisticated error diagnosis and handling may take place, but is those ideas are omitted here since they are not related to the basic principles of the present invention.

As long as the procedure checks that the old memory device is still present, the procedure goes back to box 140 for further collecting operational data. Accordingly, as an alternative to the branch in box 115 described above, when in box 115 it has been found that the inserted memory device does not contain any data to be downloaded, the procedure may also go directly to box 140 and collection of operational data can take place again.

It is worth noting, that even when an embedded computer according to the industrial standard is present, there will still be low level HW control in the machine unit, for example for control of motors, sensors and actuators of the machine. That low-level control is performed by specialized (low level) microcontroller-based HW boards. Such low level HW boards communicate and exchange data with the embedded PC through one of the system busses or via some type of data line such as, for example, a RS-232 or USB interface, a wired or radio network connection for Ethernet or alike and so on.

Figure 3B:
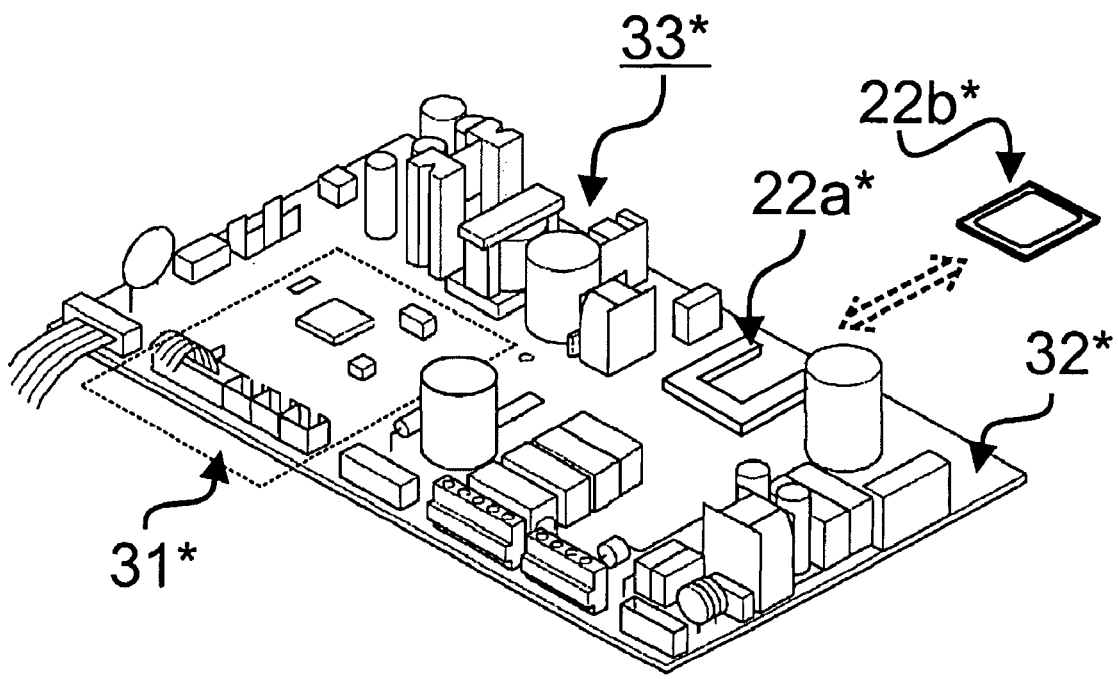
FIG. 3b illustrates a 3-D-view of a microcontroller-based board according to one aspect, where both microcontroller-based board and power supply board are integrated in one common board.

In the following a further grade of higher integration with respect to the hardware components (as a further aspect addressed herein) is illustrated in FIG. 3b. Firstly, FIG. 3a illustrates a microcontroller-based (low level hardware) board 31 according to the prior art, as shown in FIG. 1, together with a required power supply board 32, which basically can be a switching power interface board or an alternative power supply board such as a hand spin power generating board which are used in machines for use in remote areas lacking easy or reliable access to a power supply networks.

In contrast to FIG. 3a, FIG. 3b illustrates an improved design of the high-integrated low level hardware board according to an additional aspect. In FIG. 3b the low level hardware board 31\* is integrated together with the power supply board 32\* on one common board 33\*. The area of the printed circuit board (PCB) 33\*, which comprises, basically, the functionalities of the board 31 of FIG. 3a, is denoted by a dashed box 31\*. Further, there is also provided a connector 22a* for a respective memory device 22b* according to the first to fifth aspect, discussed above.

It is worth noting that the low-level hardware board in FIG. 3a may have a respective connector for a respective memory device according to the first to fifth aspect, as well; whereby FIG. 3a would provide an example of an embodiment as depicted in FIG. 2b.

Figure 3C:
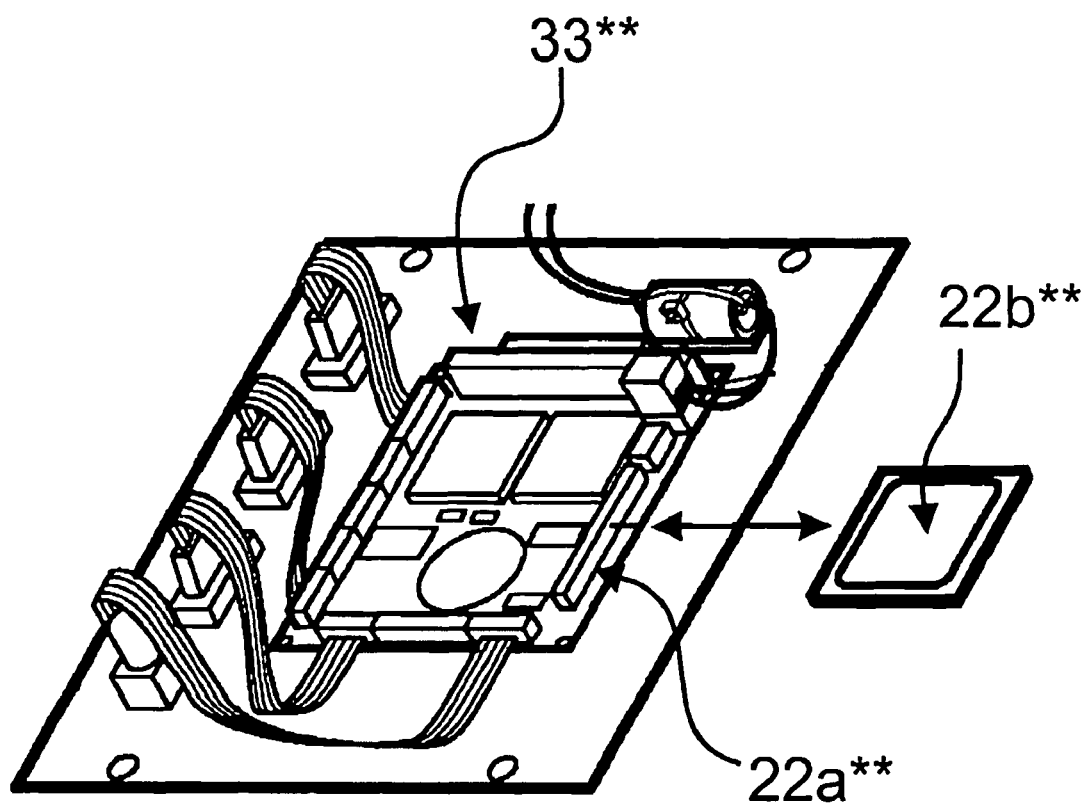
FIG. 3c illustrates an 3-D-view of an Embedded PC according to another aspect of the invention.

FIG. 3c illustrates a 3-D-view of a further embodiment, in which an Embedded PC is present, such a PC, for instance, is used in a premium machine unit. In FIG. 3c at the Embedded PC board 33 is illustrated a connector 22a, for instance for a Compact Flash (CF) card as memory device, together with a sketch of a respective connectable and disconnectable memory device 22b, which in case of a CF connector has to be a Compact Flash (CF) Card; movement of the memory device 22b in the corresponding connect and disconnect, respectively, operation is depicted by an arrow. The connector 22a** may be implemented in different (mechanical) kinds, wherein the only essential aspect will be that it provides a compatible interface to the respective used attachable/detachable memory device. Alternatively, it is also possible to have the connector at a suitable location at the machine unit. For that purpose the connector then could have a wired connection to a respective socket on the board of the embedded PC. This provided freedom of choice for having the best location, which is easily accessible for the memory device connector and a suitable mechanical position for the PC board within the machine unit.

In connection with the FIG. 3a to 3c, it is worth noting, that these drawing figures are mainly intended to illustrate the general idea of several aspects discussed herein. In other words, it should be appreciated that it is not the purpose of these drawing figures to restrict the invention to any circuit board design as provided herein by way of an example.

Accordingly, this herein supposed design aspects provide for a higher level of integration, better performance, reduced power consumption, as well as reduced electromagnetic (EM) emissions. Moreover, by this design instead of a controller board, power interface/supply board, a display board, and an encoder board, only the combined signal controller/power interface board, a display board, and an encoder board are required. Thus, complexity of assembly can be reduced, reliability can be increased, and cable count will be reduced, which overall results in lower system cost.

In case, the machine unit is a so-called high-end device, having an embedded computer are, the graphic interface for the user such as a graphical CRT-, TFT- or LCD-display, as visual user interface, can also be provided by the embedded computer. The displayed data thereon are usually provided by means of a respective graphic adapter connected to the respective computer hardware. In a straight forward approach, the computer may be an embedded personal computer (PC) comprising at least one processor as central processing unit, data storage devices, various data buses with respective interfaces, such as an universal serial bus (USB) and/or personal system/2 bus (PS/2), an integrated drives electronics bus (IDE) or its successors the enhanced integrated drives electronics bus (EIDE) or the advanced technology attachment bus (ATA).

Accordingly, the functions and features described above may be implemented into such embedded computer device. The control means for control of the update/upgrade and/or the data collection are then to be implemented on the embedded computer in respective software. The fixed memory means of the low-level hardware boards of the machine are already connected via data connections to the embedded computer and it is known per se to the skilled person how to implement the proposed download of data via such data connection between the embedded board and a microcontroller-based board from the embedded computer to memory means of the low level hardware board. For instance, the fixed memory area of the low-level hardware board can be made accessible by the embedded computer, which hold the respective hardware board, supply a respective programming signal to the fixed memory and finally download the update/upgrade data into the fixed memory.

Further, in case of a machine unit with embedded PC, the whole system may have interfaces for network connectivity as wired or wireless connection to a local area network (LAN), which may also provide access to more remote computers via the World Wide Web or internet or dedicated direct connections. In a wide used configuration of machine units, the embedded PC controls the graphic adapter for the graphical display as well as the data input devices, for example, the above-mentioned keyboard and/or a pointing device such as a mouse or light pen. In principle, networking capability is also possible when no PC is available in the machine unit. For instance, the machine unit could be provided with a low level networking device. This would provide an alternative possibility for updating/upgrading data as well as for collecting of operational data of the machine unit. So networking capability is not strictly limited to machine units with a PC.

Finally, yet importantly, for remote areas or high flexible usability there exist particular automotive shop equipment, which comprises hand spin generators for generation of the required electrical energy for the low-level hardware functions. The current design of hand spin wheel balancers consists of a controller board and the respective hand spin power interface board. In line with the invention, both boards are integrated in one board such that a single board provides the controller function and the hand spin power interface function. This will also result in a smaller board. This, of course, can be combined with the proposed other aspects of the invention such as the high-integration of micro-controller board and power supply board, which in such a case would be the hand spin power interface. Further, of course also the exchangeable memory device for updating and/or upgrading can by implemented.

The general concept described and illustrated above by way of examples provides an update/upgrade concept comprising a convenient procedure for making updates or upgrades of control software and/or configuration data available to microcontroller-based hardware of machine units in the field without requirement of special tools and experience. In particular, by use of a standard memory device as known in the field of digital cameras, mp3-players whatsoever, together with a procedure which detects an available update/upgrade stored on such memory device and performs a respective download of the update/upgrade data to the respective microcontroller-based hardware, if applicable. An additional or optional aspect relates to collecting of operational data during operation of a machine unit in the field, which operational data can be transferred/carried back to the manufacturer of the machine unit for research and development purposes as well as for quality control, also a tracking of machine units through their lifetime is made possible thereby.

While there have been shown and described and pointed out fundamental features of the invention as applied to the embodiments thereof, it will be understood that various omissions and substitutions and changes in the form and details of the apparatus and method described may be made by those skilled in the art without departing from the present invention as defined in the attached claims. For example, it is expressly intended that all combinations of those elements and/or method steps, which perform substantially the same function in substantially the same way to achieve the same results, be within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of designed choice. It is the intention, therefore, to be limited only as indicated by the scope of the claims appended hereto.

The embodiments of an apparatus for performing one of the methods described herein may include or be utilized with any appropriate voltage or current source, such as a battery, an alternator, a fuel cell, and the like, providing any appropriate current and/or voltage, such as about 12 Volts, about 42 Volts and the like.

The invention claimed is:

1. A method for exchanging data in memory means of at least one hardware device of an automotive shop service machine, the method comprising steps of:
   connecting a first data storage device to the automotive shop service machine;
   checking whether the data stored in the memory means of the at least one hardware device is an older version than the version of data on the first data storage device; and
   downloading the data from the first data storage device into the memory means of the at least one hardware device, thereby replacing the data stored in the memory means with the data stored in the first data storage device, dependent on the result of the checking;
   the method further comprising:
   before connecting the first data storage device, disconnecting a second data storage device connected to the automotive shop service machine such that the disconnecting and the connecting form an exchanging operation, in which the second data storage device is replaced by the first data storage device, wherein operational data of the automotive shop service machine during operation of the automotive shop service machine is collected and stored in the second storage device before the exchanging.

2. The method according to claim 1, wherein the downloading comprises at least one of updating or upgrading of software code means in the memory means.

3. The method according to claim 1, wherein the downloading comprises at least one of updating or upgrading of configuration parameters.

4. The method according to claim 1, wherein the downloading is performed either automatically or in response to an input by the user of the automotive shop service machine.

5. The method according to claim 1, wherein the first or second data storage device, when connected to the automotive shop service machine, is used in a read-write mode to store the operational data of the automotive shop service machine during the lifetime of the automotive shop service machine such that the operational data can be permanently collected.

6. The method according to claim 1, further comprising returning the second data storage device to the manufacturer of the automotive shop service machine.

7. The method according to claim 1, further comprising transferring by the second data storage device the collected operational data to a central computer unit for maintenance scheduling.

8. A computer program product at least comprising code means adapted to implement a method when run on a computer device of an automotive shop service machine, the method comprising steps of:
   collecting operational data of the automotive shop service machine during operation of the automotive shop service machine;
   storing the collected operational data of the automotive shop service machine in a data storage device;
   detecting a connection of the data storage device to the computer device;
   checking whether data stored in memory means, monitored by the computer device and part of the automotive shop service machine, is an older version than the version of data stored in the data storage device; and
   downloading the data from the data storage device into the memory means of at least one low hardware device, depending on the result of the checking.

9. The computer program product according to claim 8, wherein in the method the downloading of the data from the data storage device is performed either automatically or in response to an input by a user.

10. The method according to claim 1, further comprising using the memory means as a data carrier for collected operational data of the automotive shop service machine.

11. The method according to claim 10, further comprising providing the memory means in the form of a non-volatile memory device selected from the group consisting of a compact flash card, a smart media card, a multimedia card (MMC), a secure digital memory card (SD), a memory stick, a micro secure digital memory card, and a micro drive.

12. An automotive shop service machine comprising:
   at least one microcontroller-based board specialized for a certain function of the automotive shop service machine,
   at least one hardware interface for a user-operable removable connection of a first data storage device on which computer program code means or configuration data for the at least one microcontroller-based board is stored, and
   control means which is configured to:
   collect operational information of the automotive shop service machine during the life of the automotive shop service machine,
   store the collected operational information in the first data storage device,
   detect connection of the first data storage device to the at least one hardware interface,
   determine whether data present in a memory means of the at least one microcontroller based board is older than data stored on the first data storage device, and
   dependent on the determination result, download the data from the first data storage device into the memory means of the at least one microcontroller based board.

13. The automotive shop service machine according to claim 12, further comprising an embedded computer device as a central control unit of the automotive shop service machine, wherein the embedded computer device provides for a user interface of the automotive shop service machine and comprises the control means.

14. The automotive shop service machine according to claim 12, wherein the first data storage device comprises at least one first memory area which is read-only memory and at least one second memory area which can be used in read-write mode, and collected operational information during the life of the automotive shop service machine is stored in the at least one second memory area.

15. The automotive shop service machine according to one of the claims 12 or 14, wherein the collected operational information comprises at least one of: issued error codes, diagnostic data, statistical data, performed service operations, or operation counters.

16. The automotive shop service machine according to claim 15, wherein the collected operational information is retrievable by a user in a dedicated mode of a user interface program in the form of at least one of a printout and a user interface screen.

17. The automotive shop service machine according to claim 16, wherein the collected operational information is available to other systems through a wired or wireless network connection.

18. The automotive shop service machine according to claim 12, wherein the automotive shop service is one of a wheel balancer, a wheel aligner, a brake test stand, and an automotive diagnosis unit.

19. The automotive shop service machine according to claim 12, wherein the at least one microcontroller-based board specialized for a certain function comprises a microcontroller having an integrated memory comprising an area of random access memory as a working memory and an area of non-volatile memory for storing of computer program code means and configuration data.

* * * * *